United States Patent [19]

Egerton et al.

[11] Patent Number: 5,215,948
[45] Date of Patent: Jun. 1, 1993

[54] CERAMIC GREEN BODIES

[75] Inventors: Terence A. Egerton; Graham P. Dransfield, both of Stockton on Tees; Anthony P. Bromley, Ellington; Frank L. Riley, Leeds, all of England

[73] Assignee: Tioxide Group Services Limited, London, England

[21] Appl. No.: 732,768

[22] Filed: Jul. 19, 1991

[30] Foreign Application Priority Data

Jul. 30, 1990 [GB] United Kingdom ............... 9016690

[51] Int. Cl.$^5$ .............................. C04B 35/46
[52] U.S. Cl. .................... 501/134; 501/127; 501/135
[58] Field of Search ............ 501/127, 134, 135; 428/403; 106/442, 816, 286.4, 286.5, 286.8, 438, 449

[56] References Cited

U.S. PATENT DOCUMENTS

| | | | |
|---|---|---|---|
| 3,770,470 | 11/1973 | Swank | 106/442 X |
| 3,895,963 | 7/1975 | McGowan et al. | 501/153 |
| 3,944,683 | 3/1976 | Church et al. | 427/226 X |
| 4,568,502 | 2/1986 | Theodore et al. | 264/63 |
| 4,626,517 | 12/1986 | Watanabe et al. | 501/96 |
| 4,632,849 | 12/1986 | Ogawa et al. | 427/215 |
| 4,678,762 | 7/1987 | Agarwal et al. | 501/127 |
| 4,814,370 | 3/1989 | Kramer et al. | 524/391 |
| 4,882,110 | 11/1989 | Kramer et al. | 524/401 X |
| 4,965,228 | 10/1990 | Hutchinson | 501/12 |
| 4,970,181 | 11/1990 | Pearson | 501/127 |
| 4,985,379 | 1/1991 | Egerton et al. | 501/104 |
| 5,055,434 | 10/1991 | Thometzek et al. | 427/215 X |

FOREIGN PATENT DOCUMENTS

| | | |
|---|---|---|
| 1274552 | 9/1990 | Canada . |
| 249130 | 12/1987 | European Pat. Off. . |
| 0331460 | 3/1989 | European Pat. Off. . |
| 20590 | 3/1965 | Japan . |
| 281018 | 6/1985 | Japan . |
| 60-192605 | 10/1985 | Japan . |
| 1247374 | 11/1968 | United Kingdom . |
| 1256421 | 12/1971 | United Kingdom . |
| 1349089 | 3/1974 | United Kingdom . |
| 2204030 | 11/1988 | United Kingdom . |

OTHER PUBLICATIONS

James S. Reed, *Introduction to the Principles of Ceramic Processing*, 1988, pp. 329–333 and 380–386.
Encyclopedia of Chemical Technology, Kirk–Othmer, vol. 23, Third Edition, p. 148, Titanium Compounds (Inorganic).
Barksdale, J., *Titanium, Its Occurrence, Chemistry, and Technology*, 2nd Ed., pp. 552–559, 670 and 671 (1966).

*Primary Examiner*—Karl Group
*Assistant Examiner*—Chris Gallo
*Attorney, Agent, or Firm*—Baker & Botts

[57] ABSTRACT

Green bodies suitable for use in manufacturing ceramic articles are provided. The bodies comprise a coherent mass of particles of titanium dioxide free of organic binder and having a fracture stress measured by a biaxial disc flexure test of at least 5 MPa. The particles of titanium dioxide are coated with at least one inorganic oxide or hydrous oxide.

The green body can be shaped by drilling, sawing etc. to a desired shape approximating to that of the ceramic article which it is used to produce. Generally such shaping is considerably easier than shaping the finished ceramic article.

22 Claims, No Drawings

CERAMIC GREEN BODIES

This invention relates to precursors for ceramic articles. The precursors are formed by pressing an inorganic powder and are suitable for firing to form ceramic articles. The precursors are commonly referred to as green bodies and the strength of a green body is known as its green strength. A common measure of the green strength of a green body is the fracture stress of a test specimen fabricated from the body. This invention particularly refers to green bodies which have high green strength.

High green strength in a green body is useful because it allows the green body to be further shaped e.g. by drilling, filing etc. approximately to the shape of the finished fired ceramic article. Generally it is easier and cheaper to shape a green body than to shape a finished fired ceramic article. Therefore any necessary shaping of the finished ceramic article is reduced to a minimum if the green body is able to be shaped.

Hitherto organic binders have been added to inorganic powders to increase green strength when the powders are dry pressed to form a green body which is subsequently shaped or alternatively where a shaped green body is produced by a process such as injection moulding. It is necessary to remove the organic binder prior to firing the green body to form the ceramic article and this is generally achieved by burning it out. During burning out it is necessary for oxygen to diffuse to the centre of the body and for combustion products to diffuse out of the body. This is time consuming and difficult to achieve. It is particularly difficult to achieve satisfactory removal of an organic binder from green bodies formed from an inorganic powder of small particle size since such a powder results in green bodies having a small pore size.

According to the present invention a green body suitable for use in manufacturing a ceramic article comprises a coherent mass of particles of titanium dioxide coated with at least one inorganic oxide or hydrous oxide, the mass being substantially free of organic binder and the body having a fracture stress of at least 5 MPa as measured by a biaxial disc flexure test in which a circular test disc of the coherent mass with an approximate thickness of 3 mm and approximate radius 16 mm is supported on three fixed steel balls with a diameter of 3 mm symmetrically arranged on the circumference of a circle of radius 9 mm and a fourth steel ball of diameter 12.5 mm located on the axis of the circle applies a load to the test disc the fracture stress being calculated using the formula $$S = 0.4775 \left( \frac{L}{T^2} \right) \left[ 1.28 \ln \left( \frac{0.009}{R} \right) + 0.64 + 0.18 \left( \frac{1.62 \times 10^{-4} - R^2}{R_d^2} \right) \right]$$

wherein
S = Fracture Stress in MPa
L = Applied Load in Newtons
R = Radius in meters of the contact area between the test disc and the ball of 12.5 mm diameter
T = Thickness of the test disc in meters
$R_d$ = Radius of test disc in meters R is calculated using the formula $$R = 0.721 \, (1.007 \times 10^{-13} \, L)^{\frac{1}{3}}$$

According also to the invention a method for the production of a green body suitable for use in manufacturing a ceramic article comprises coating particles of titanium dioxide with at least one inorganic oxide or hydrous oxide and forming said particles into a coherent mass having a fracture stress of at least 5 MPa as hereinbefore defined.

Processing of green bodies of the present invention to form ceramic articles does not require diffusion of gases into the bodies and hence some of the disadvantages of the use of an organic binder are overcome by the present invention.

The method of measuring the fracture stress of a green body used to define the products of this invention is a biaxial disc flexure test. Measurements are made using equipment based on that described by I. D. Sivill, Ph.D. Thesis, Nottingham University 1974. A test disc is supported on three fixed balls symmetrically arranged on the circumference of a circle of radius A mm. A fourth ball, of diameter $D_b$, located on the axis of the circle, applies a load to the test disc. Fracture stresses are calculated from the formula:

$$S = 0.4775 \left( \frac{L}{T^2} \right) \left[ (1 + V_d) \ln \left( \frac{A}{R} \right) + \frac{1}{2}(1 + V_d) + \frac{1}{2}(1 - V_d) \left( \frac{2A^2 - R^2}{R_d^2} \right) \right]$$

Where
S = Fracture Stress in MPa
L = Applied load in Newtons
R = Radius of contact area between disc and ball of diameter $D_b$ in mm.
$R_d$ = Radius of disc in mm
T = Thickness of disc in mm
$V_d$ = Poissons ratio for disc material
A = Radius of Support Circle The contact area radius R is given by the formula:

$$R = 0.721 \left[ LD_b \left( \frac{(1 - V_b^2)}{E_b} + \frac{(1 - V_d^2)}{E_d} \right) \right]^{\frac{1}{3}}$$

Where
$D_b$ = diameter of ball
$E_d$ = Young's Modulus for disc material
$E_b$ = Young's Modulus for ball material
$V_b$ = Poissons ratio for ball material In the test method used in this invention the three fixed balls are steel, have a diameter of 3 mm and are arranged on a circle of radius 9 mm. The fourth ball, also steel, has a diameter of 12.5 mm. The thickness of the circular test disc is approximately 3 mm and its radius is approximately 16 mm. In applying the formula to calculating the fracture stress of the green bodies of the invention the Young's Modulus is taken to be that of fully dense titania, namely 283 GPa. This value is used for consistency since the true Young's Modulus will depend upon the green density of the individual discs. The procedure is justified since the calculated results are relatively insensitive to the value that is used for Young's Modulus.

Alternative methods for measuring the fracture stress of ceramics are known and can be used to measure the fracture stress of the green bodies of this invention. Usually the actual value obtained by such alternative methods will be different to that obtained by the method used in this invention although the skilled man will recognise that it is possible to correlate results obtained by alternative methods with those obtained by the method used in this invention.

The green bodies of the current invention have a fracture stress of at least 5 MPa when measured by the method described hereinbefore. Preferably the fracture stress is at least 10 MPa.

The particles of titanium dioxide are coated with at least one inorganic oxide or hydrous oxide. Oxides which are useful as coating materials include those of titanium, zirconium, magnesium, silicon and aluminium.

In preferred embodiments of the present invention the particles of titanium dioxide are coated with either hydrous alumina and hydrous silica or hydrous alumina and hydrous zirconia.

The physical properties and structure of a ceramic article manufactured from a green body of the current invention are significantly affected by the size of the particles of which the green body is comprised. When the green body is formed the particle size of the component particles of titanium dioxide is chosen so as to produce a ceramic article with desired properties.

Typically the green body comprises a coherent mass of particles whose size is from 0.05 micron to 1.0 micron. Preferably the particles have a size from 0.05 micron to 0.5 micron.

When the particles of titanium dioxide are coated with an oxide or hydrous oxide which is not a titanium oxide the thickness of the coating affects the chemical composition of the green body and hence that of a ceramic article produced from the green body and the thickness is chosen to produce any desired composition. Typically the coating will comprise between 1 and 30% by weight of the particles. Preferably the coating comprises between 1 and 10% by weight of the particles.

According to the method for the production of a green body of the invention the particles of titanium dioxide are treated in such a manner that an oxide or hydrous oxide is deposited as a coating on their surface. Preferably the coating operation is carried out as a wet treatment process in which, initially, the titanium dioxide particles are dispersed in water. The dispersion is effected normally by stirring the particles with water. If absolutely necessary, a dispersing agent can be present but this can introduce undesirable contamination into the product and is preferably avoided. It is possible to improve the degree of dispersion by milling in, for example, a sand mill if desired.

To the aqueous dispersion of particles of titanium dioxide is added a water soluble hydrolysable salt of the metal which is to be present as an oxide or a hydrous oxide on the particles and in an amount sufficient to introduce on hydrolysis the required amount of oxide or hydrous oxide as coating. Typical water soluble salts which can be employed depend on the particular oxide or hydrous oxide to be deposited but include chlorides, nitrates, some sulphates, phosphates and acetates and, when the oxide or hydrous oxide to be deposited as coating is silica or alumina, a water soluble silicate or aluminate as appropriate can be used such as sodium silicate or sodium aluminate. Mixtures of water soluble hydrolysable salts are used to precipitate coatings of mixed oxides or hydrous oxides. In an alternative process coatings of more than one oxide or hydrous oxide are formed as separate layers by precipitating different oxides or hydrous oxides separately.

In the preferred method precipitation of the oxide or hydrous oxide on the particles is effected by adjusting the pH of the dispersion to a value at which the oxide or hydrous oxide is deposited. As an example zirconium chloride is used to deposit a coating of hydrous zirconia by raising the pH of the dispersion to a value sufficiently alkaline to deposit the hydrous zirconia. Alternatively hydrous silica can be deposited as a coating on the particles from an alkaline solution of an alkali metal silicate by lowering the pH of the dispersion to a value at which hydrous silica is deposited on the particles. It is preferable that where alkali is used to adjust the pH of the dispersion then the alkali is ammonium hydroxide since this does not introduce any objectionable metallic ions into the dispersion and waste ammonia can be driven off by heating.

Any suitable means of mixing the dispersion of particles is employed during the deposition of the oxide or hydrous oxide coating.

After deposition of the oxide or hydrous oxide coating the coated particles are usually separated by filtration, washed if necessary and dried.

Preferably, the dried product is ground to remove any aggregation that has occurred during processing. The grinding is sufficient to substantially remove aggregates which have formed during the coating process without causing attrition of the coating of oxide or hydrous oxide. Any suitable technique can be used and typically the product is ball milled in a suitable medium such as propan-2-ol overnight using zirconia beads as a grinding medium.

Any other suitable means of providing a coating of oxide or hydrous oxide such as coating by hydrolysis of alkoxides, evaporation of solvent from a solution of a readily decomposable salt such as an acetate or oxalate or by vapour-phase reaction can be used to produce particles suitable for forming green bodies of the invention.

The coated particles are then formed into a green body by any suitable means. Typically the green body is formed by dry pressing and suitable methods are uniaxial pressing or isostatic pressing.

For example the powders may be uniaxially pressed using a 32 mm diameter stainless steel die at a pressure of 22 MPa. Stearic acid may be used to lubricate the die walls, but no binder or pressing additive is used. Die pressed powders may be further densified by isostatic pressing by containing the die pressed pieces in a polyethylene bag which is then immersed in the sample chamber of an isostatic press (Stansted Fluid Power Ltd). Typically, powders are isostatically pressed at 170 MPa. Alternatively green compacts may be formed directly by firmly packing powder into moulds made from, e.g., Vinamold.

The green body thus formed has a high green strength (fracture stress) as hereinbefore defined. Consequently it is possible to shape the green body by, for example, sawing, drilling, filing etc. to produce any desired shape. This shaped green body is then fired to produce a ceramic article which requires little shaping to achieve the final desired article.

The invention is illustrated by the following Examples.

EXAMPLE 1

Comparative Example

A sample of titanium dioxide (of specific surface area ca 7 $m^2g^{-1}$) prepared by gas-phase oxidation of titanium tetrachloride was slurried in an alkaline solution of sodium polyphosphate at pH 9, and classified. After heating to 50° C. the slurry was neutralised to pH 6.9 with dilute sulphuric acid over a period of 20 minutes, mixed for a further 30 minutes and then filtered, washed, dried and fluid energy milled with steam at a steam:pigment ratio of 1.8:1.

EXAMPLE 2

The titanium dioxide used in Example 1 was coated with hydrous oxides of alumina and silica to give a total coating of 4%, consisting of 3% $SiO_2$ from sodium silicate and 1% $Al_2O_3$ from aluminum sulphate. The classified slurry temperature was raised to 70° C. and sodium silicate solution added over 30 minutes and mixed for 15 minutes. Sulphuric acid was added over 60 minutes to give a pH of 7.0 to 7.5. The temperature was allowed to fall to 50° C. and then aluminum sulphate solution was added over a period of 30 minutes followed by a mixing time of 5 minutes. Sodium hydroxide was added over 30 minutes to give a pH of 7.0 and a 15 minute mixing period allowed. The sample was filtered, washed and milled as in Example 1.

EXAMPLE 3

The titanium dioxide used in Example 1 was coated with 1% zirconia from zirconium orthophosphate and 3% alumina added in two stages; 1% from aluminium sulphate and 2% from caustic sodium aluminate. Sufficient zirconium orthophosphate to form a coating of 1% zirconia was added to a slurry of the titanium dioxide at 300 grams/liter, pH 9.5 and 50° C. over 15 minutes. After mixing for 5 minutes sufficient aluminium sulphate to form a 1% alumina coating was added over 15 minutes.

After a further 5 minutes stirring the pH was raised to between 10 and 10.5 with sodium hydroxide and sufficient caustic sodium aluminate to form a further 2% coating of alumina was added over 30 minutes together with sufficient sulphuric acid to maintain the pH at 10 to 10.5. After mixing for a further 45 minutes the slurry was adjusted to pH 6.5 with sulphuric acid, the coated titanium dioxide was filtered, washed, dried and milled as in Examples 1 and 2.

Samples of the powders prepared according to Examples 1, 2 and 3 were formed into discs by isostatic pressing at 170 MPa and the following strengths were recorded on the discs using the method of I. D. Sivill.

| | |
|---|---|
| Example 1 | 2.8 MPa |
| Example 2 | 10.2 MPa |
| Example 3 | 10.4 MPa |

We claim:

1. A green body suitable for use in manufacturing a ceramic article comprising a coherent mass of particles of titanium dioxide, said particles being coated with at least one inorganic oxide or hydrous oxide, the mass being substantially free of organic binder and the body having a fracture stress of at least 5 MPa as measured by a biaxial disc flexure test in which a circular test disc of the coherent mass with an approximate thickness of 3 mm and approximate radius 16 mm is supported on three fixed steel balls with a diameter of 3 mm symmetrically arranged on the circumference of a circle of radius 9 mm and a fourth steel ball of diameter 12.5 mm located on the axis of the circle applies a load to the test disc the fracture stress being calculated using the formula $$S = 0.4775 \left(\frac{L}{T^2}\right)\left[1.28\ln\left(\frac{0.009}{R}\right) + 0.64 + 0.18\left(\frac{1.62 \times 10^{-4} - R^2}{R_d^2}\right)\right]$$

wherein
S = Fracture Stress in MPa
L = Applied Load in newtons
R = Radius in meters of the contact area between the test disc and the ball of 12.5 mm diameter
T = Thickness of the test disc in meters
$R_d$ = Radius of test disc in meters
R is calculated using the formula $$R = 0.721 (1.007 \times 10^{-13} L)^{\frac{1}{3}}$$

2. A green body according to claim 1 in which the fracture stress is at least 10 MPa.

3. A green body according to claim 1 or 2 in which the inorganic oxide or hydrous oxide is selected from the group consisting of oxides and hydrous oxides of titanium, zirconium, magnesium, silicon and aluminium.

4. A green body according to claim 1 in which the particles have a size of from 0.05 micron to 1.0 micron.

5. A green body according to claim 4 in which the size of the particles is from 0.05 micron to 0.5 micron.

6. A green body according to claim 1 in which the coating of oxide of hydrous oxide comprises between 1 and 30% be weight of the particles.

7. A green body according to claim 6 in which the coating comprises between 1 and 10% by weight of the particles.

8. A method for the production of a green body suitable for use in manufacturing a ceramic article comprising coating particles of titanium dioxide with at least one inorganic oxide or hydrous oxide and forming said particles into a coherent mass having a fracture stress of at least 5 MPa as measured by a biaxial disc flexure test in which a circular test disc of the coherent mass with an approximate thickness of 3 mm and approximate radius 16 mm is supported on three fixed steel balls with a diameter of 3 mm symmetrically arranged on the circumference of a circle of radius 9 mm and a fourth steel ball of diameter 12.5 mm located on the axis of the circle applies a load to the test disc the fracture stress being calculated using the formula $$S = 0.4775 \left(\frac{L}{T^2}\right)\left[1.28\ln\left(\frac{0.009}{R}\right) + 0.64 + 0.18\left(\frac{1.62 \times 10^{-4} - R^2}{R_d^2}\right)\right]$$

wherein

S = Fracture Stress in MPa
L = Applied Load in Newtons
R = Radius in meters of the contact area between the test disc and the ball of 12.5 mm diameter
T = Thickness of the test disc in meters
$R_d$ = Radius of test disc in meters
R is calculated using the formula $$R = 0.721 \, (1.007 \times 10^{-13} L)^{\frac{1}{3}}$$

9. A method according to claim 8 in which the particles are coated using a wet coating method in which the titanium dioxide particles are dispersed in water.

10. A method according to claim 9 in which the oxide or hydrous oxide is formed by mixing the dispersion of titanium dioxide particles with a water soluble hydrolysable salt and adjusting the pH of the mixture so formed to precipitate the oxide or hydrous oxide as a coating.

11. A method according to claim 10 in which the pH is adjusted by using ammonium hydroxide.

12. A method according to claim 9 in which the degree of dispersion of the particles of titanium dioxide is improved by milling.

13. A method according to claim 8 in which the coated product is ground to remove aggregates formed during the coating process before the particles are formed into a coherent mass.

14. A method according to claim 8 in which the coherent mass is formed by uniaxial pressing or isostatic pressing.

15. A method according to claim 8 in which coatings of more than one oxide or hydrous oxide are formed as separate layers on the titanium dioxide particles.

16. A green body suitable for use in manufacturing a ceramic article comprising a coherent mass of particles of titanium dioxide, said particles being coated with an amount of up to 4% by weight with respect to the weight of the particles of at least one inorganic oxide or hydrous oxide, the mass being substantially free of organic binder and the body having a fracture stress of at least 5 MPa as measured by a biaxial disc flexure test in which a circular test disc of the coherent mass with an approximate thickness of 3 mm and approximate radius 16 mm is supported on three fixed steel balls with a diameter of 3 mm symmetrically arranged on the circumference of a circle of radius 9 mm and a fourth steel ball of diameter 12.5 mm located on the axis of the circle applies a load to the test disc the fracture stress being calculated using the formula $$S = 0.4775 \left( \frac{L}{T^2} \right) \left[ 1.26 \ln \left( \frac{0.009}{R} \right) + 0.64 + 0.18 \left( \frac{1.62 \times 10^{-4} - R^2}{R_d^2} \right) \right]$$

wherein
S = Fracture Stress in MPa
L = Applied Load in Newtons
R = Radius in meters of the contact area between the test disc and the ball of 12.5 mm diameter
T = Thickness of the test disc in meters
$R_d$ = Radius of test disc in meters
R is calculated using the formula $$R = 0.721 \, (1.007 \times 10^{-13} L)^{\frac{1}{3}}.$$

17. A green body according to claim 16 in which the fracture stress is at least 10 MPa.

18. A green body according to claim 16 in which the inorganic oxide or hydrous oxide is selected from the group consisting of oxides and hydrous oxides of titanium, zirconium, magnesium, silicon and aluminum.

19. A green body according to claim 16 in which the particles have a size of from 0.05 micron to 1.0 micron.

20. A green body according to claim 19 in which the size of the particles is from 0.05 micron to 0.5 micron.

21. A green body according to claim 16 wherein the particles are prepared
  (a) dispersing particles of titanium dioxide in water,
  (b) adding thereto a water soluble hydrolyzable salt of a metal selected from titanium, zirconium, magnesium, silicon and aluminum to form a dispersion, and thereafter
  (c) adjusting the pH of the dispersion to a value at which the oxide or hydrous oxide of the metal is deposited on the particles of titanium dioxide.

22. A green body according to claim 1 wherein the particles are prepared
  (a) dispersing particles of titanium dioxide in water,
  (b) adding thereto a water soluble hydrolyzable salt of a metal selected from titanium, zirconium, magnesium, silicon and aluminum to form a dispersion, and thereafter
  (c) adjusting the pH of the dispersion to a value at which the oxide or hydrous oxide of the metal is deposited on the particles of titanium dioxide.

* * * * *